No. 723,590. PATENTED MAR. 24, 1903.
C. L. DURBORAW.
NUT LOCK.
APPLICATION FILED SEPT. 23, 1902.
MODEL.

Witnesses:-
Herman R. Newman
Henry Watson

Inventor:-
Charles L. Durboraw
By Chapin & Ferguson
Attorney

UNITED STATES PATENT OFFICE.

CHARLES L. DURBORAW, OF BALTIMORE, MARYLAND, ASSIGNOR OF ONE-HALF TO CHARLES E. BEMIS, OF DRYAD, WASHINGTON.

NUT-LOCK.

SPECIFICATION forming part of Letters Patent No. 723,590, dated March 24, 1903.

Application filed September 23, 1902. Serial No. 124,530. (Model.)

*To all whom it may concern:*

Be it known that I, CHARLES L. DURBORAW, a citizen of the United States, residing at Baltimore, in the State of Maryland, have invented certain new and useful Improvements in Nut-Locks, of which the following is a specification.

This invention relates to improvements in nut-locks.

The object of the invention is to provide a device for use upon railway fish-plates or upon parts of machinery which are subject to vibration, by means of which the nut can be securely locked in position and prevented from being worked loose or jolted off by the constant vibration of the parts upon which said device may be employed.

Other features of the invention will be fully set forth in the description of the accompanying drawings, in which—

Figure 1:
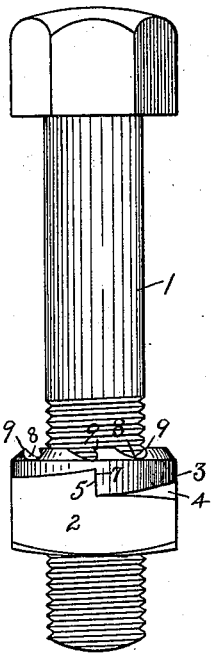
Figure 2:
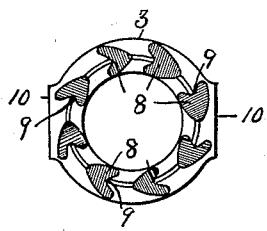
Figure 4:
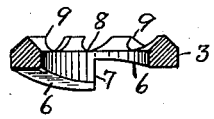
Figure 3:
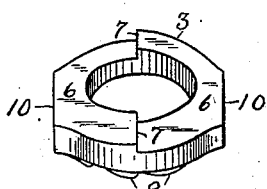
Figure 5:
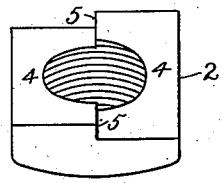

Figure 1 is a vertical elevation of a bolt having my improved nut-lock applied thereto. Fig. 2 is a plan view of the locking-washer, showing the inclined teeth. Fig. 3 is an inverted plan view of the locking-washer, showing the inclined faces. Fig. 4 is a vertical sectional view of the locking-washer, and Fig. 5 is a view showing the inclined faces of the nut.

Similar reference-numerals designate like parts throughout the several views of the drawings.

Referring to the accompanying drawings, forming part of this specification, 1 designates a bolt which may be of any preferred construction, 2 the nut, and 3 the locking-washer. The nut 2 is provided with two oppositely-inclined faces 4 and two shoulders 5, the object of which will presently appear. The locking-washer 3 is provided on one side with two oppositely-inclined faces 6 and two shoulders 7, against which latter the shoulders 5 of the nut 2 impinge when the said nut is being screwed on the bolt 1, which causes the washer 3 to revolve and advance with the nut. The other side of the locking-washer 3 tapers from the center toward the outer edge and also toward the central bolt-opening, as seen in cross-section in Fig. 4, the said tapering surface being provided with a number of cut-outs 8, thus forming a number of inclined teeth 9, which latter prevent the said locking-washer 3 from turning backward on the bolt. The washer is also provided with two flat surfaces 10 on opposite sides for the reception of a wrench, the said flat surfaces being flush with the sides of the nut 2.

The operation of the device is as follows: The bolt 1 is first placed in position in the parts to be held thereby and the locking-washer 3 placed over the end of the bolt, with the teeth 9 toward the head. The nut is then placed over the end of the bolt 1, with the inclined faces 4 against the inclined faces 6 of the washer 3. The nut 2 is screwed up on the bolt, which, owing to the impinging shoulders 5 and 7, causes the washer 3 to advance with the nut 2. When the washer 3 comes into contact with the metal, the tapering surface will cut into the metal and embed the teeth 9 therein. The washer will be prevented from turning backward on the bolt 1 by the inclined teeth 9. The washer being thus held securely by the teeth 9, the nut 2 will be prevented from turning backward on the bolt 1 by the inclined facing-surfaces 4 and 6. When it is desired to remove the nut and washer, a wrench is placed over the nut 2 and also over the flat surfaces 10 of the washer 3 and both turned together.

Having thus described my invention, what I claim is—

1. A nut-lock consisting of a locking-washer having two flat surfaces diametrically opposite each other and flush with the sides of the nut, two inclined faces and two shoulders on the lower surface, and the upper surface being tapered and provided with a number of inclined teeth; and a nut having two inclined faces and two shoulders which latter impinge against the shoulders on the washer.

2. In combination with a bolt, a washer adapted to be fitted thereon, said washer having two flat surfaces diametrically opposite each other and flush with the sides of the nut, two inclined faces and two shoulders on the lower surface, and the upper surface being tapered and provided with a number of inclined teeth; and a nut having two inclined faces and two shoulders which latter impinge against the shoulders on the washer and cause the latter to revolve with the nut when the said nut is being screwed upon the bolt.

In testimony whereof I affix my signature in the presence of two witnesses.

CHARLES L. DURBORAW.

Witnesses:
THOS. C. BAILEY,
W. B. BEALMEAR.